No. 11,985. Reissued May 13, 1902.

J. W. HORNER.

METAL DOOR MAT.

(Application filed Jan. 30, 1902.)

Attest.
A. P. Fageol,
W. E. Ellis.

John W. Horner: Inventor.
By J. Hedwell
Atty.

UNITED STATES PATENT OFFICE.

JOHN W. HORNER, OF DES MOINES, IOWA, ASSIGNOR TO McNEELY BROTHERS, OF MARSHALLTOWN, IOWA.

METAL DOOR-MAT.

SPECIFICATION forming part of Reissued Letters Patent No. 11,985, dated May 13, 1902.

Original No. 657,872, dated September 11, 1900. Application for reissue filed January 30, 1902. Serial No. 91,852.

*To all whom it may concern:*

Be it known that I, JOHN W. HORNER, a citizen of the United States of America, residing and having post-office address at 912 Sixteenth street, in the city of Des Moines, county of Polk, and State of Iowa, have invented a new and useful Metal Door-Mat, of which the following is a specification.

The object of this invention is to provide a construction in flexible door-mats whereby contacting portions of strips of flat metal may be frictionally engaged, to the end of resisting lateral motion of one relative to the other.

My invention consists in the construction, arrangement, and combination of elements hereinafter set forth, pointed out in my claims, and illustrated by the accompanying drawings, in which—

Figure 1:
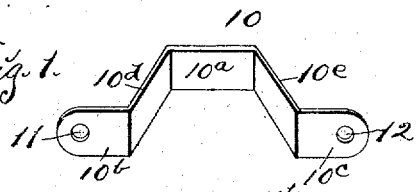
Figure 2:
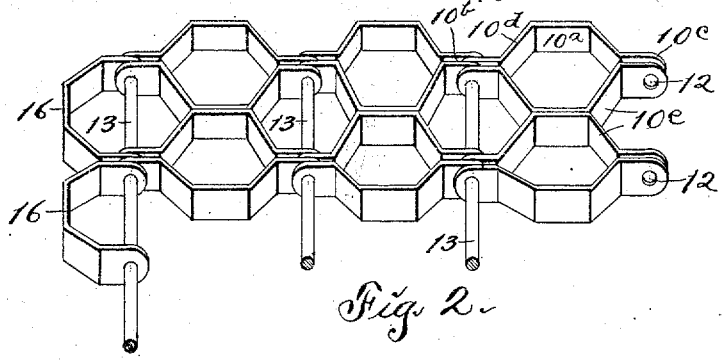
Figure 3:
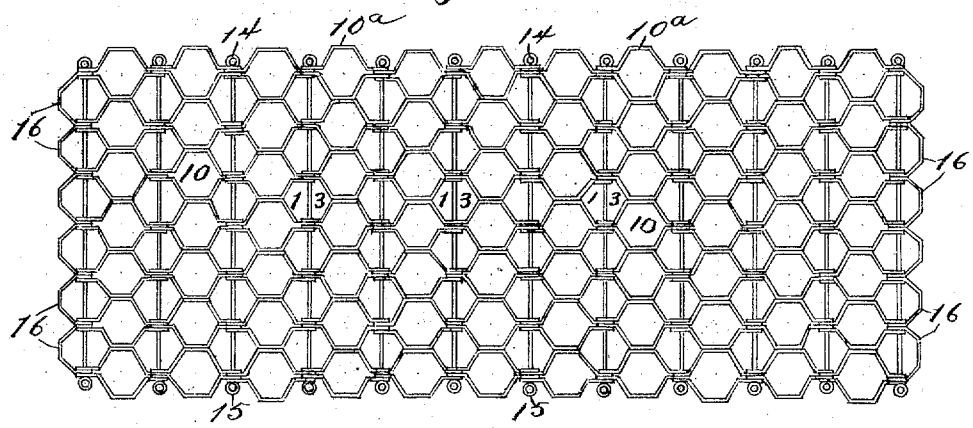

Figure 1 is a perspective of a piece of flat metal bent into angular form susceptible of producing, in combination with a mating piece, an ornamental hexagonal cell or mesh. Fig. 2 is a perspective illustrating a plurality of the pieces shown in Fig. 1 arranged in contact in series and hinged or pivotally connected by means of pivot-rods, to the end of producing a flexible mat. Fig. 3 is a plan and top view of a mat constructed of series of angularly-bent pieces of flat metal connected pivotally by pivot-wires and formed with a border at either end.

In the construction of the device as shown the numeral 10 designates a strip, clip, or short piece of metal relatively thin and broad. The central portion of the strip 10 is bent laterally, forming obtuse angles with the end portions thereof, and formed with a flattened relatively broad contact portion $10^a$ at its center. The contact portion $10^a$ is connected with the end portions $10^b$ $10^c$ by obliquely-positioned integral portions $10^d$ $10^e$, arranged in converging planes. The contact portion $10^a$ is in a plane parallel with the plane common to the alining end portions $10^b$ $10^c$. Apertures 11 12 are formed in the end portions $10^b$ $10^c$ of the strip. A plurality of the short pieces or strips $10^a$ are brought into parallel position, so that their perforations will coincide, and round wires or pivot-rods 13 are mounted in said perforations, end portions of adjacent strips overlapping, as the strips are mounted end to end on a plurality of such pivot-rods. One end of each round wire is provided with a coil or head 14, against which the first pieces or strips strung upon said wire will abut, and all the overlying ends of corresponding pieces are jointly connected by means of said wire or rod, and then by forming a coil 15 on the other end of said wire or rod all of the short pieces or strips will be securely connected with each other in series. Parallel rows of metal cells or meshes are thus produced, to the end of constructing a completed, flexible, and ornamental metal mat. The contact portions $10^a$ of the strips will form the extreme outer points or margins of the sides of the mat and within or between the sides of the mat will abut and frictionally engage each other oppositely, as illustrated in Figs. 2 and 3. By reason of the frictional engagement of the adjacent broad contacting portions the horizontal positioning of the members relative to a floor-surface is insured, and in the event of the use of said mat by scraping a boot or shoe in contact with its upper surface, and consequently in contact with the edges of the strips or short pieces 10, said frictional engagement will prevent the upward movement of one of the short pieces relative to the strip in contact therewith, and thus insure that the mat will present a uniform upper surface when scraped upon laterally. The ends of the mat are composed of short flat pieces 16 bent outward at their centers to produce ornamental scalloped edges, as clearly illustrated in Fig. 3. All of the wear on the mat will be on the edges of the short pieces or strips 10 and 16, and the mat is reversible, being alike on both sides. Therefore a mat thus constructed will last much longer than woven mats or mats made with their central portions apexed and not engaging with broad frictional surfaces.

It will be observed that at the points of pivoting of the strips or short pieces to the pivot rods or wires there are four end portions collocated in parallel relation, thus presenting a large resistance to support heavy weight applied to the surface of the mat.

I claim as my invention—

1. In a metal door-mat, the combination of the pivot-rods, the short pieces of flat metal bent laterally at their central portions and having their straight end portions perforated and pivotally mounted on the pivot-rods, the end portions of adjacent pieces overlapping each other across the pivot-rods and the outermost faces of the laterally-bent central portions of the short flat pieces being formed relatively long and arranged for mutual contact frictionally.

2. A flexible door-mat consisting of the pivot-rods, the short pieces of flat metal bent laterally at their central portions and having their end portions perforated and extended on a common plane and pivotally mounted on the pivot-rods, the end portions of adjacent pieces overlapping each other across the pivot-rods, the outermost faces of the laterally-bent central portions of the short flat pieces being formed relatively long and arranged for mutual contact frictionally, and end pieces pivoted on the outermost rods having the central portions conforming in contour to the pieces forming the body of the mat and the end portions bent on parallel planes, substantially as shown and described.

JOHN W. HORNER.

In presence of—
S. C. SWEET,
R. B. FAGEOL.